(12) United States Patent
Emokpae

(10) Patent No.: US 10,890,970 B2
(45) Date of Patent: Jan. 12, 2021

(54) FLEX FORCE SMART GLOVE FOR MEASURING SENSORIMOTOR STIMULATION

(71) Applicant: Lloyd E. Emokpae, Baltimore, MD (US)

(72) Inventor: Lloyd Erhunwunse Emokpae, Baltimore, MD (US)

(73) Assignee: LASARRUS CLINIC AND RESEARCH CENTER, Middle River, MD (US)

( * ) Notice: Subject to any disclaimer, the term of this patent is extended or adjusted under 35 U.S.C. 154(b) by 0 days.

(21) Appl. No.: 16/231,756

(22) Filed: Dec. 24, 2018

(65) Prior Publication Data

US 2020/0201433 A1  Jun. 25, 2020

(51) Int. Cl.
| | |
|---|---|
| *G06F 3/01* | (2006.01) |
| *A63B 24/00* | (2006.01) |
| *G06N 3/08* | (2006.01) |
| *G06N 20/00* | (2019.01) |

(52) U.S. Cl.
CPC .......... *G06F 3/014* (2013.01); *A63B 24/0003* (2013.01); *A63B 24/0062* (2013.01); *G06F 3/017* (2013.01); *G06N 3/084* (2013.01); *G06N 20/00* (2019.01); *A63B 2024/0071* (2013.01)

(58) Field of Classification Search
CPC ........ G06F 3/014; G06F 3/017; G06F 3/0346; G06N 20/00; G06N 3/084; A63B 24/0062; A63B 24/0003; A63B 2024/0071
See application file for complete search history.

(56) References Cited

U.S. PATENT DOCUMENTS

| | | | |
|---|---|---|---|
| 6,526,669 B2 | 3/2003 | Nagata | |
| 7,780,541 B2 | 8/2010 | Bauer | |
| 8,572,764 B2 | 11/2013 | Thelmann | |
| 9,084,565 B2 | 7/2015 | Mason et al. | |
| 9,173,612 B2 | 11/2015 | Craelius et al. | |
| 9,183,760 B2 | 11/2015 | Shin et al. | |
| 9,221,170 B2 | 12/2015 | Barajas et al. | |
| 9,301,563 B2 | 4/2016 | Hardy et al. | |
| 9,311,789 B1 * | 4/2016 | Gwin | G08C 19/00 |
| 9,345,424 B2 | 5/2016 | Wang et al. | |
| 9,668,675 B2 | 6/2017 | Cunningham | |
| 9,710,060 B2 | 7/2017 | McMillen et al. | |
| 9,877,682 B2 | 1/2018 | Craelius et al. | |
| 9,891,718 B2 | 2/2018 | Connor | |
| 9,962,576 B2 | 5/2018 | Anderson | |

(Continued)

FOREIGN PATENT DOCUMENTS

WO  WO-2016157217 A2 *  10/2016  ........... A61B 5/1116

*Primary Examiner* — Abhishek Sarma
(74) *Attorney, Agent, or Firm* — U. Maryland Baltimore Carey School of Law MIPLRC/IPEC

(57) ABSTRACT

An embodiment of the invention provides a method where input is received in sensors on a glove, where the sensors include a force sensor, a flex sensor, and/or a range-of-motion IMU sensor. The input is sent from the sensors on the glove to a processor on the glove. The input is analyzed with the processor to determine an exercise being performed by a user of the glove. A trained neural network is used to analyze the input from the sensors; and, the orientation of the glove is recognized with the trained neural network. The input and the orientation are classified as a grip exercise and/or a rotation exercise.

19 Claims, 14 Drawing Sheets

(56) References Cited

U.S. PATENT DOCUMENTS

| | | | |
|---|---|---|---|
| 10,052,066 B2 | 8/2018 | Rogers et al. | |
| 2007/0196799 A1* | 8/2007 | Romcevich | A63B 71/143 |
| | | | 434/247 |
| 2012/0029399 A1* | 2/2012 | Sankai | A61B 5/1121 |
| | | | 601/40 |
| 2012/0144554 A1* | 6/2012 | Thellmann | A63B 21/4019 |
| | | | 2/161.1 |
| 2015/0374575 A1* | 12/2015 | Kamper | A61H 1/0288 |
| | | | 601/40 |
| 2016/0175683 A1* | 6/2016 | Caroll-James | A63B 71/06 |
| | | | 700/91 |
| 2016/0313798 A1 | 10/2016 | Connor | |
| 2017/0303853 A1 | 10/2017 | McMillen et al. | |
| 2018/0260025 A1 | 9/2018 | Messingher et al. | |
| 2018/0263563 A1 | 9/2018 | McMillen et al. | |

\* cited by examiner

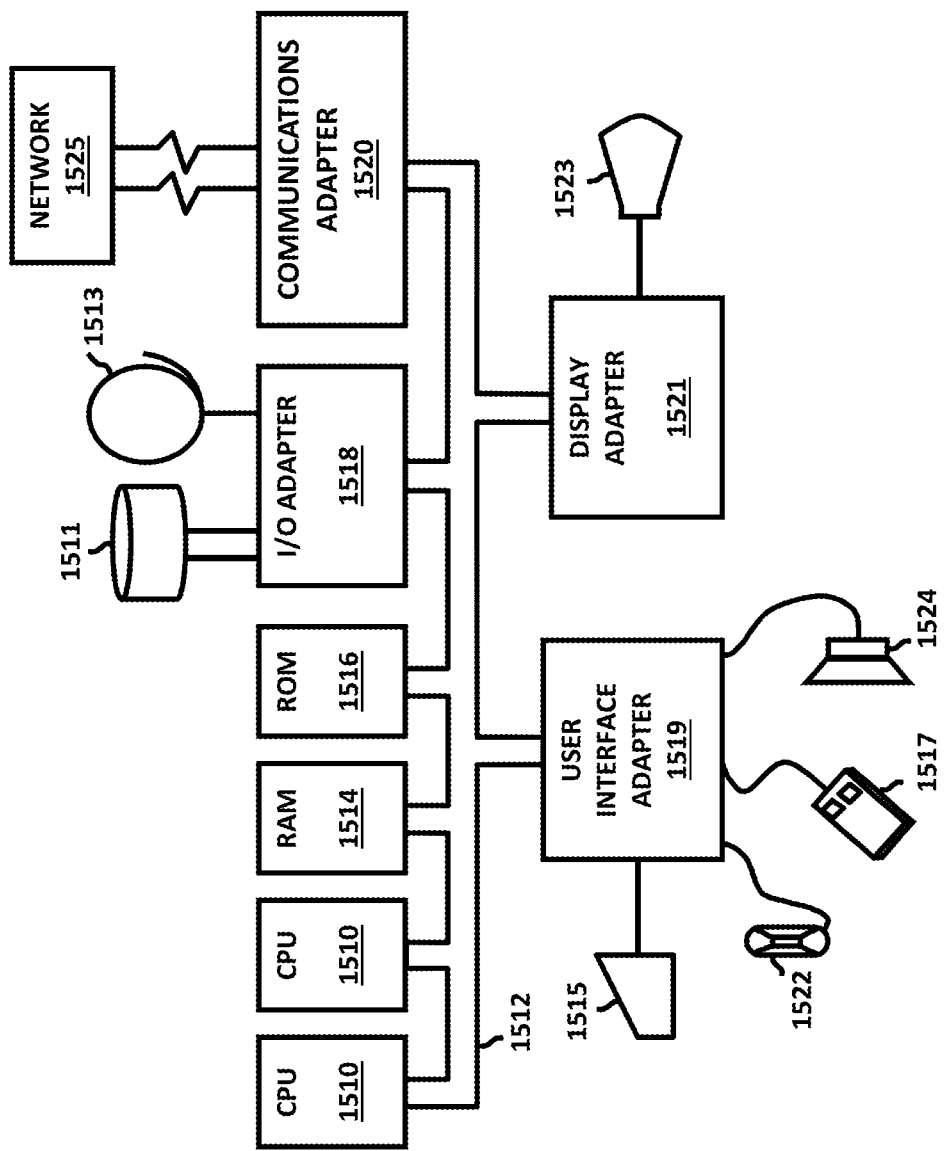

FLEX FORCE SMART GLOVE FOR MEASURING SENSORIMOTOR STIMULATION

FIELD OF THE INVENTION

The present invention relates to methods, systems, and computer program products for a flex force smart glove for measuring sensorimotor stimulation.

BACKGROUND

Each year, approximately 800,000 people suffer from a stroke which makes it the leading cause of permanent disability in the country. Research shows that the human brain is capable of self-reorganizing, a process known as neuroplasticity, especially after limb stimulation is employed, resulting in re-establishment of neural pathways that control volitional movement. Moreover, research has shown that providing instantaneous feedback during the rehabilitation process can speed up recovery. Traditional physical therapy which involves one-on-one interaction with a therapist is a conventional method used for stimulating sensorimotor activities, while robotic-assisted rehabilitation can increase the effectiveness of the repetitive exercises used in rehabilitation. Furthermore, to properly quantify the effectiveness of both conventional and robotic-assisted rehabilitation, sensorimotor measurements need to be acquired and analyzed.

SUMMARY OF THE INVENTION

An embodiment of the invention provides a method where an input is received in sensors on a glove, where the sensors include a force sensor, a flex sensor, and/or a range-of-motion IMU sensor. The input is sent from the sensors on the glove to a processor on the glove. The input is analyzed with the processor to determine an exercise being performed by a user of the glove. A trained neural network is used to analyze the input from the sensors; and, the orientation of the glove is recognized with the trained neural network. The input and the orientation are classified as a grip exercise and/or a rotation exercise.

At least one embodiment of the invention provides a glove having one or more sensors, where the sensors include a force sensor and/or a range-of-motion sensor. A processor is connected to the sensor(s), where the processor analyzes input from the sensor(s) to determine an exercise being performed by a user of the glove.

BRIEF DESCRIPTION OF DRAWINGS

The present invention is described with reference to the accompanying drawings. In the drawings, like reference numbers indicate identical or functionally similar elements.

FIG. 15 illustrates a computer program product according to an embodiment of the invention.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
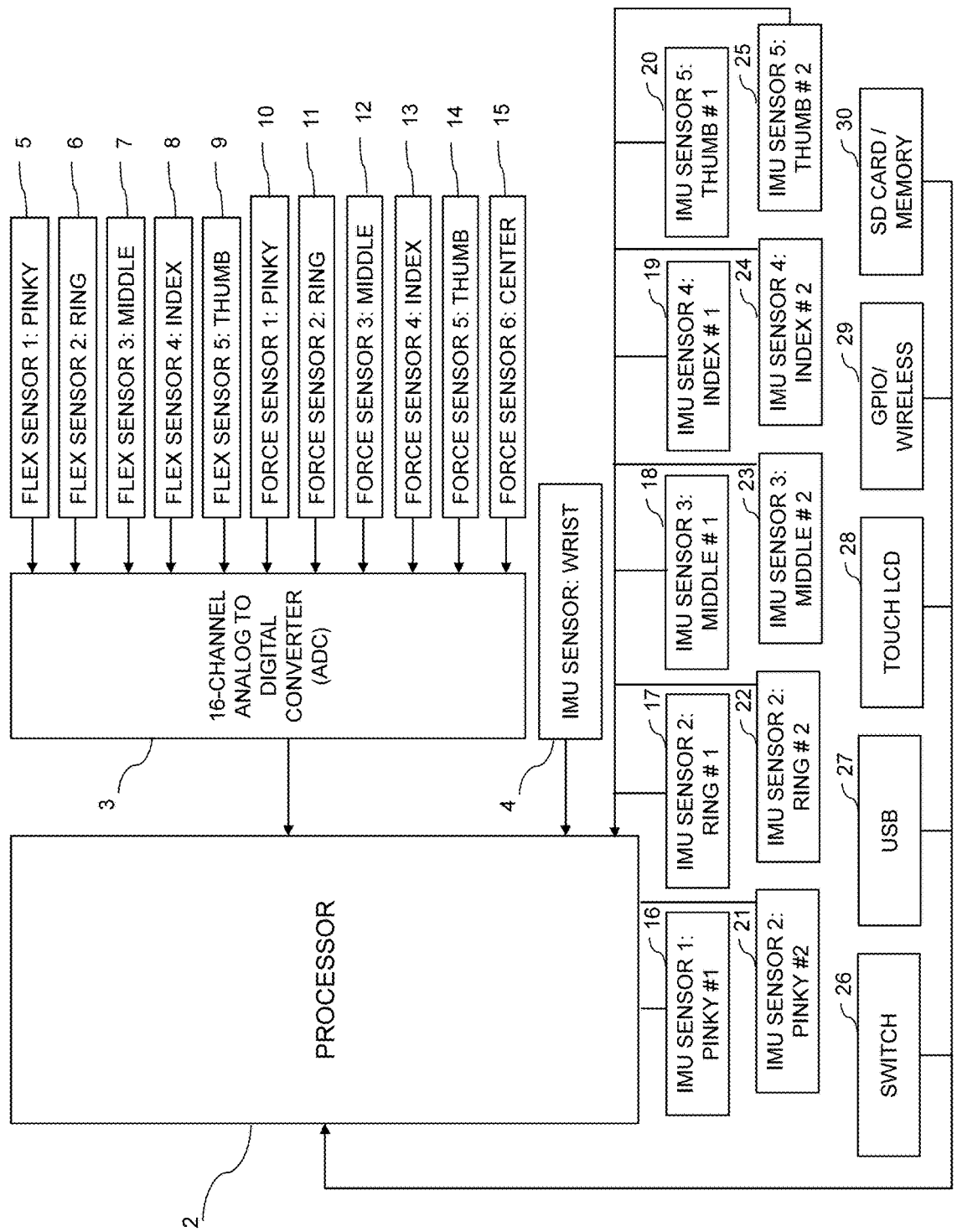
FIG. 1 is a block diagram of the circuit board according to an embodiment of the present invention.

The schematic diagram of the Flex Force Smart Glove (FFSG) design can be seen in FIG. 1. The embedded processor may interface with the analog-to-digital converter (ADC), the tri-axial digital accelerometer/gyro, the finger accelerometers the wireless interface input-output (I/O), and the switch to select between the touchscreen liquid crystal display (LCD) and the external universal serial bus (USB) connection. The external USB connection may be used to provide USB-to-Recommended Standard 232 (RS232) connection to the processor or to the touchscreen LCD. The touchscreen LCD may accept serial commands that can be used for programming through the USB connector or can be used to change the display information through the processor.

The flex sensors may obtain the bend/flex position of each finger by measuring the change in resistance due to the amount of flex; this resistance may be measured and sampled as a voltage in the ADC. The sampled voltage may then be digitized and sent to the processor for further analysis. The connection between the ADC and the processor may be through a serial peripheral interface (SPI). One of the inertial measurement unit (IMU) sensors may be placed on the flexible printed circuit board (FPCB) close to the wrist to measure the force and rotation of the wrist. The connection between the IMU and the processor may be through a two-wire serial interface. Up to Ten IMU sensors may also be placed on the FPCB to measure the force of each finger, the connection between those IMU sensors and the processor may be through the SPI.

The acquired sensorimotor information from the sensors may be transmitted to a local host (i.e. personal computer)

through a RS232-to-USB connection or through a low power wireless link interface. The touchscreen LCD may be used to provide real-time sensorimotor information to the user of the glove. The touchscreen LCD may also be used to display diagnostics information such as the wireless link connection. The jumper/switch may be used to select between the touchscreen LCD or the external RS232-to-USB connection. The connection between the jumper/switch and the processor may be through a RS232 link. The connection between the low power wireless interface and the processor may also be through a RS232 link.

Figure 3:
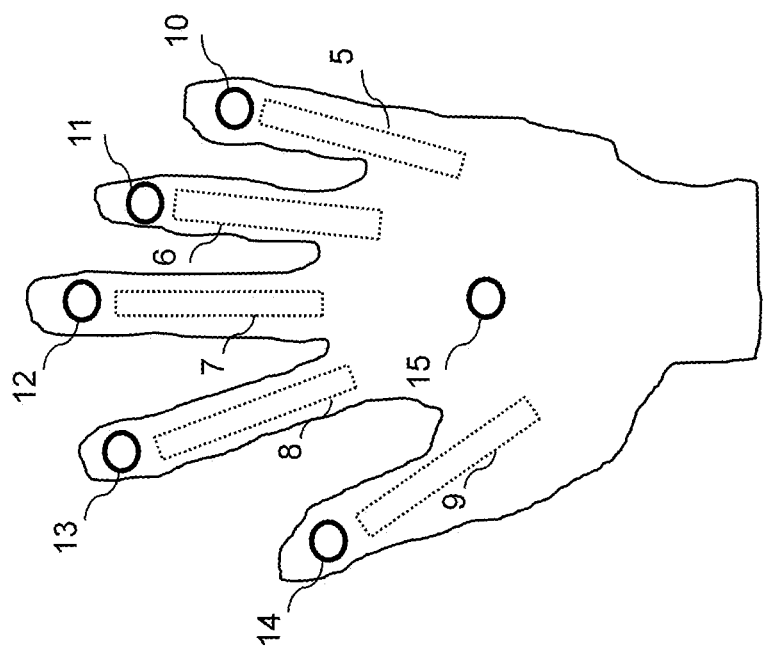
FIG. 3 is a bottom view of the sensor glove according to an embodiment of the present invention.
Figure 2:
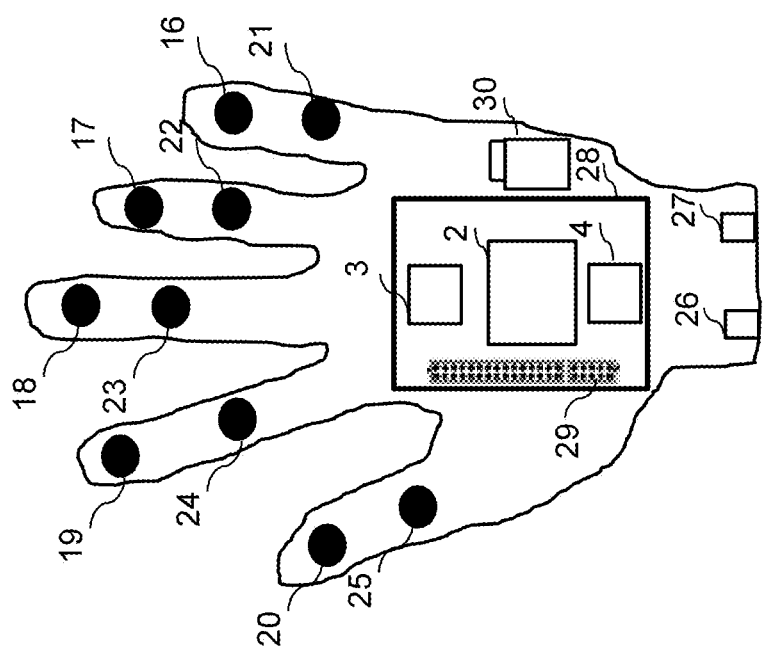
FIG. 2 is a top view of the sensor glove according to an embodiment of the present invention.

All of the components in FIG. 1 may be placed on a flexible printed circuit board (FPCB) as depicted in FIG. 2 and FIG. 3 which show the design for a right-hand glove. Note that for a left-hand glove, the placement of the components may be simply inversed. In at least one embodiment, FIG. 2 shows the top side of the FPCB where the thumb finger contains an IMU sensor, the index finger contains an IMU sensor, the middle finger contains an IMU sensor, the ring finger contains an IMU sensor, and the pinky finger contains an IMU sensor. Each finger may contain five flexible sensors that measure the bend/flex of the finger. A jumper/switch may provide three pins to connect to three external analog devices, such as a temperature sensor. The processor may be placed on the center of the FPCB to minimize the trace lengths between all peripherals. The connectors may be used to interface to the touchscreen LCD device for real-time display which can be enabled with the jumper/switch. The tri-axial accelerometers/gyros that may be used to measure the force and rotation of the wrist are also shown, which may interface to the USB connection. In at least one embodiment shown in FIG. 2, there are two additional USB connectors, where the first USB connector is used to provide in-built USB to joint test action group (JTAG) interface programming, and the second USB connector is used to provide an additional RS232-to-USB connection. Furthermore, the connector may also be used for JTAG programming which can be enabled/disabled with the jumper/switch. The outline may contain the I/O needed to interface with the low-power wireless device. Also shown in FIG. 2, there may be drilling locations for the mounting holes needed to hold the touchscreen LCD in place. In addition, the device may include an onboard micro-SD card interface that can be used to log sensorimotor information.

The bottom side of the FPCB is shown in FIG. 3 and may contain the five force sensors which measure the force of each finger. The FPCB may then be sewn onto any glove or glued to allow for nonintrusive hand sensorimotor acquisition.

In at least one embodiment of the invention, by leveraging 3D printing technology, a glove is created out of a flexible material and may house the SoC FPGA, five IMU sensors (each with 9 degrees of freedom), one force sensor placed in the center of the hand and a custom Arduino shield containing an additional IMU along with resistor divider circuits for interfacing with the analog sensors. The glove configuration can mimic a workout glove that allows the fingers to be exposed. The remaining sensors may be fitted unto a glove formed from a flexible material (e.g., cotton) that allows for measurement and acquisition of the flex and force movements of the finger. This glove may be fitted with five flex sensors and two force sensors that have been placed at selected points on the glove.

Figure 5:
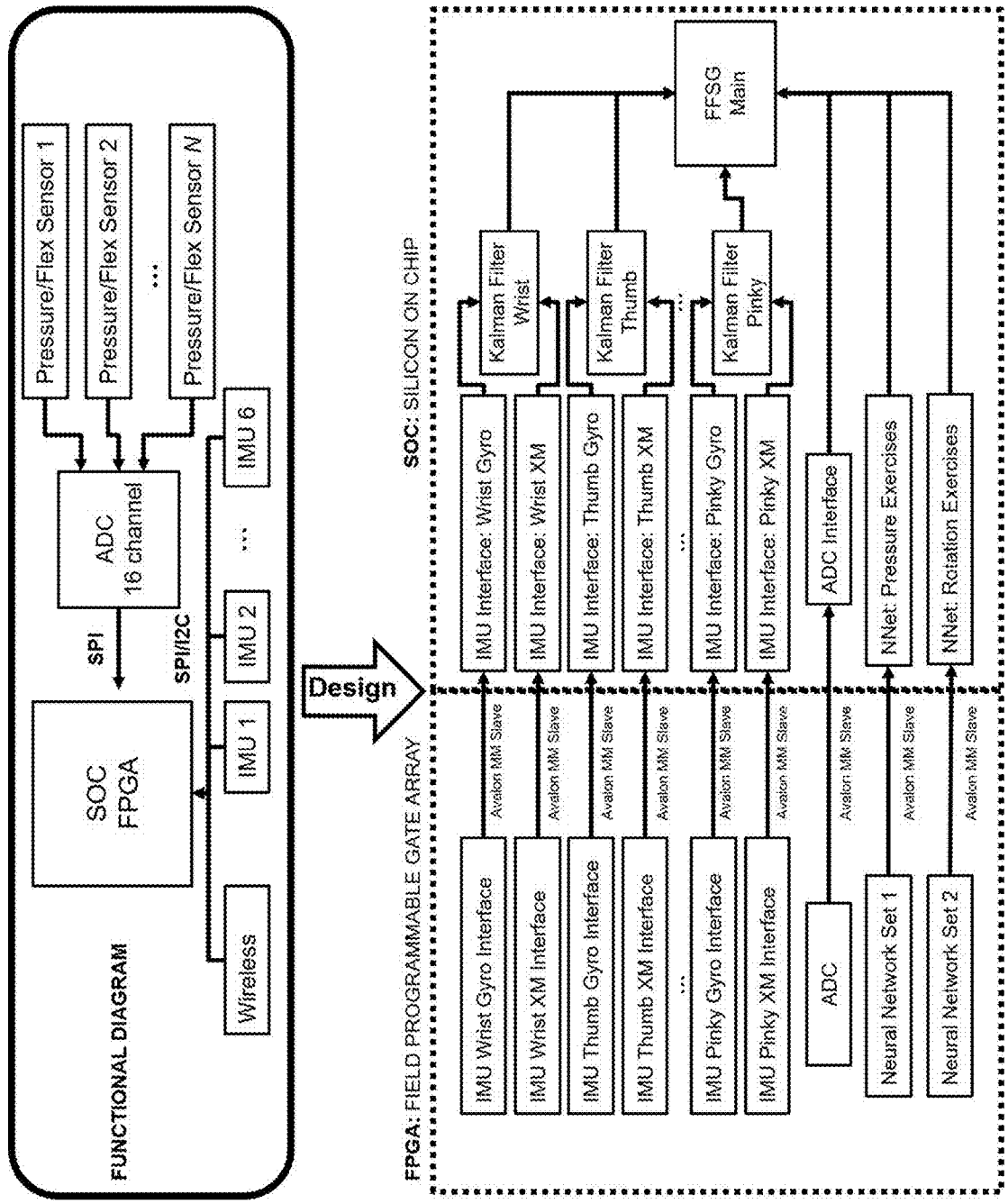
FIG. 5 illustrates a design architecture of the circuit on the sensor glove according to an embodiment of the present invention.

As shown in FIG. 5, the FPGA components are shown on the bottom left, which can consist of SPI modules for interfacing with the IMU and ADC. It can also contain two custom routines for classification of hand exercises. The SoC components are shown on the bottom right, which can interface with all of the FPGA routines through Avalon Memory Mapped Slave interfaces.

Figure 6:
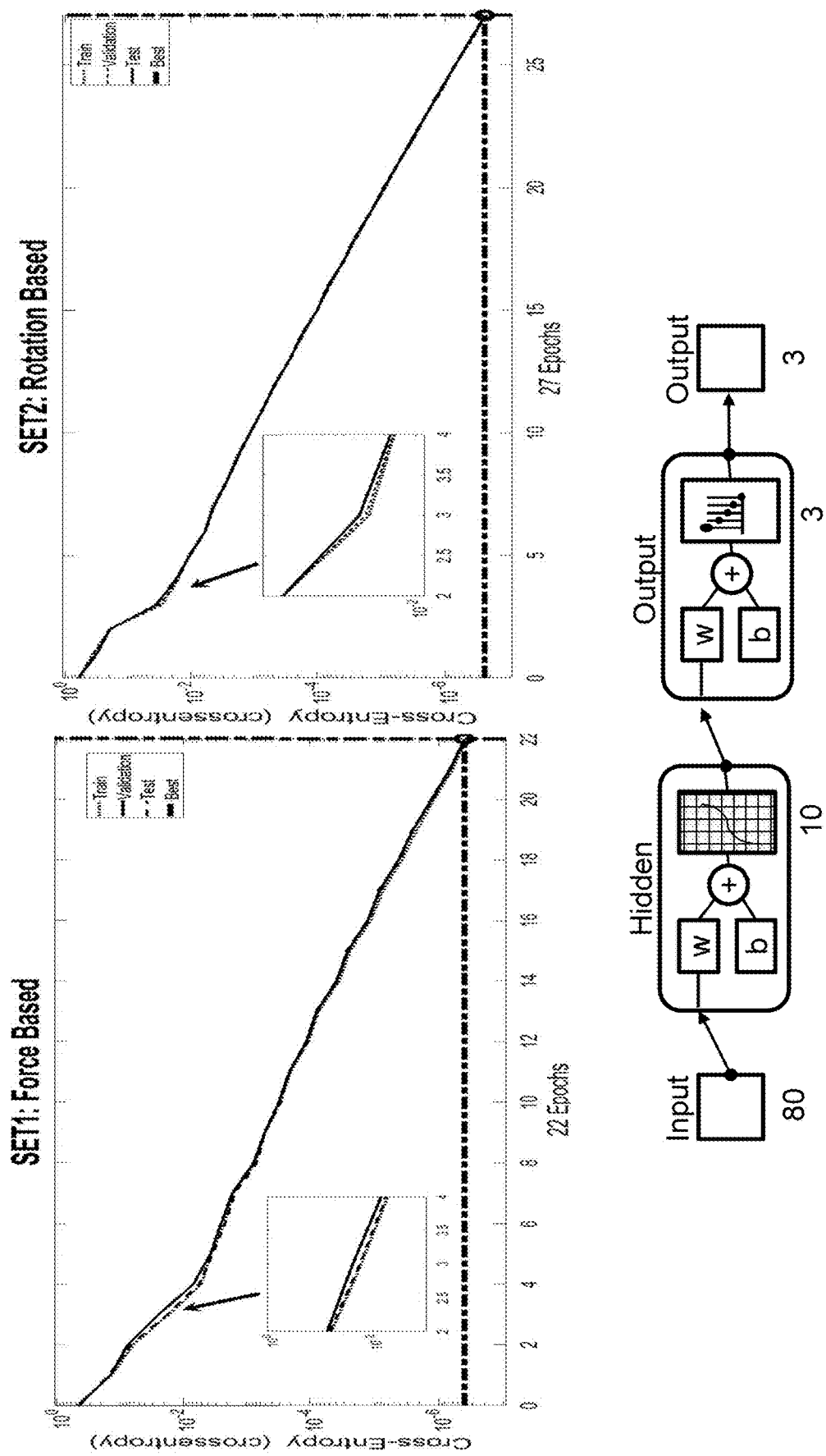
FIG. 6 is a graph of the neural network performance data sets according to an embodiment of the present invention.

From FIG. 5, there may be seen the FPGA components, which can use SPI routines to interface with all six IMUs and the ADC. This can be implemented as an Intel Quartus System (Qsys) project such that the addresses can be properly mapped to possible addresses available to the SoC. The FPGA components may also include custom neural network routines for classification of different hand exercises based on different sets: pressure-based (e.g. grip) exercise and rotation-based exercise. The neural network may be pre-trained based on recorded exercises performed on the glove. The neural network performance for both sets is shown in FIG. 6.

The neural network performance sets may be designed with identical parameters: input layer size of 80 neurons, hidden layer size of 10 neurons and output layer size of 3 neurons. The pressure-based set may reach its best validation after 22 epochs, while the rotation-based set may reach its best validation after 27 epochs.

Figure 7:
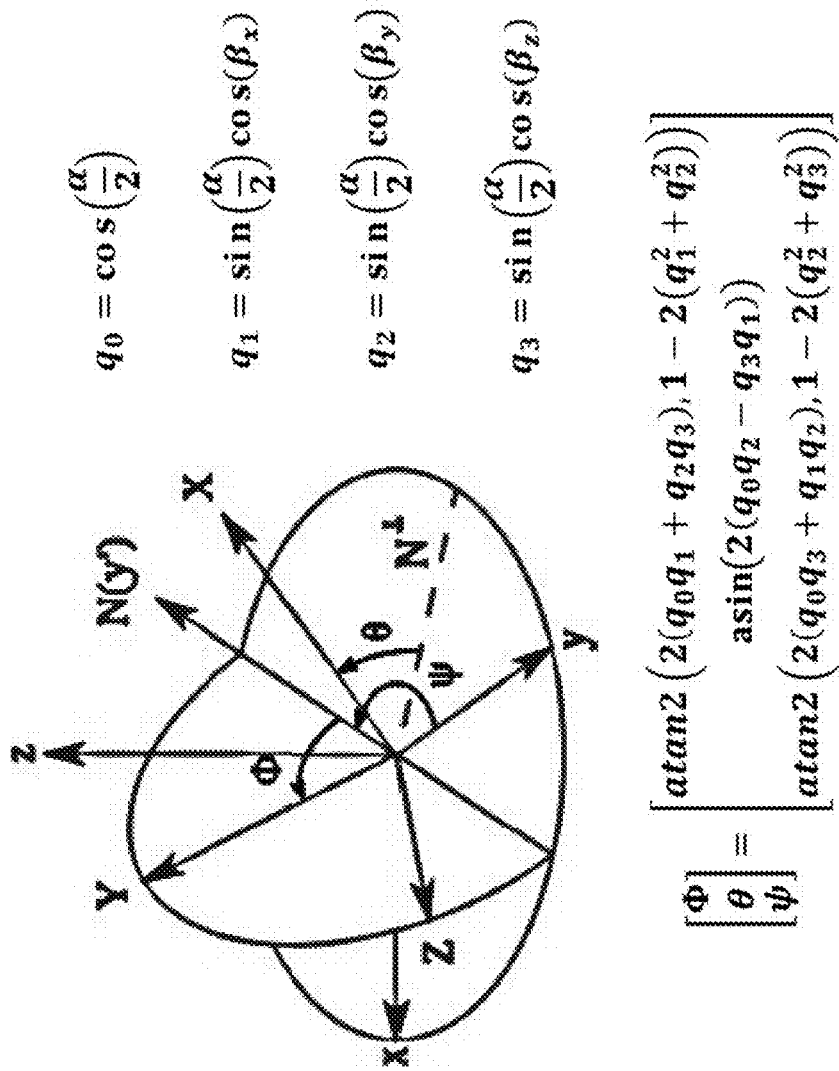
FIG. 7 is a diagram illustrating Kalman filter Quaternion calculations performed on a silicon-on-chip field programmable gate array processor (SoC FPGA) according to an embodiment of the invention.

The device may use a two-layer feed-forward network, with sigmoid hidden and softmax output neurons that can classify vectors arbitrarily well given enough neurons in its hidden layer. The network can be trained by employing a scaled conjugate gradient backpropagation. The neural network can have an input layer size of 80 neurons, which can represent the total number of raw sensor types from the glove. The device may use one hidden layer with 10 total neurons; the final output layer may consist of 3 neurons. The results show that the pressure-based set may reach the best validation after 22 epochs, while the rotation-based set may take an additional 5 epochs before meeting best validation. A Quaternion-based Kalman filter may be employed that takes the raw IMU sensor data and fuses them for pitch, roll and yaw estimates of each joint: wrist, thumb, index, middle, ring and pinky as illustrated in FIG. 7.

Figure 8:
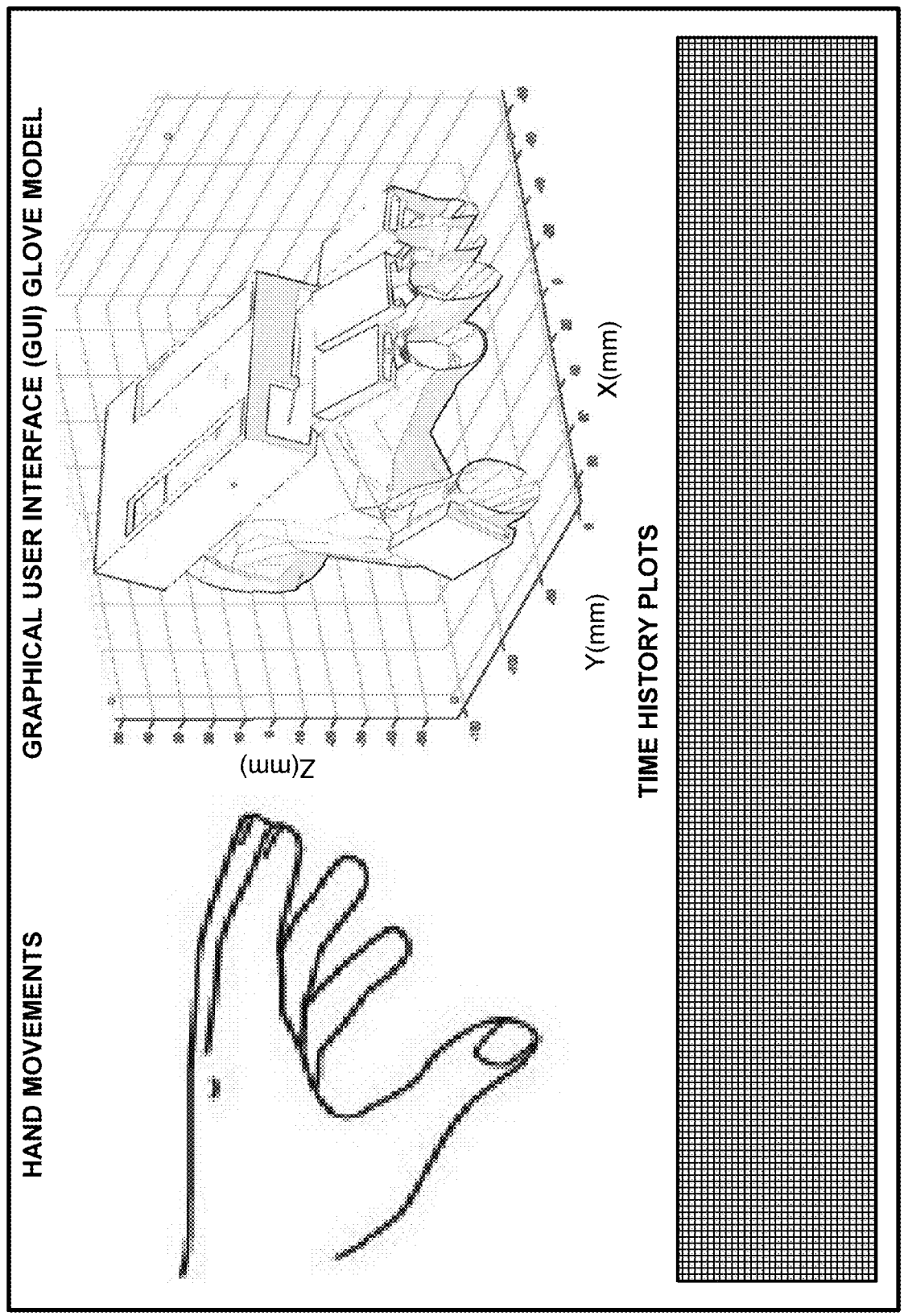
FIG. 8 illustrates a graphical user interface according to an embodiment of the invention.

In this section, various performance parameters and metrics are analyzed that may be used in the FFSG design. Those performance parameters and metrics may then be evaluated under different exercise sessions. The FPGA may be configured to interface with all sensors described in the previous section, which may be accessed by the ARM processor running on the SoC FPGA. A real-time routine may be set up that streams all of the sensor data along with the results of a neural network running on the FPGA to a local PC host. FIG. 8 illustrates an FFSG graphical user interface according to an embodiment of the invention, which allows for visualization of the glove's orientation based on the pitch, roll and yaw measurements streamed from the processing interface.

Figure 9:
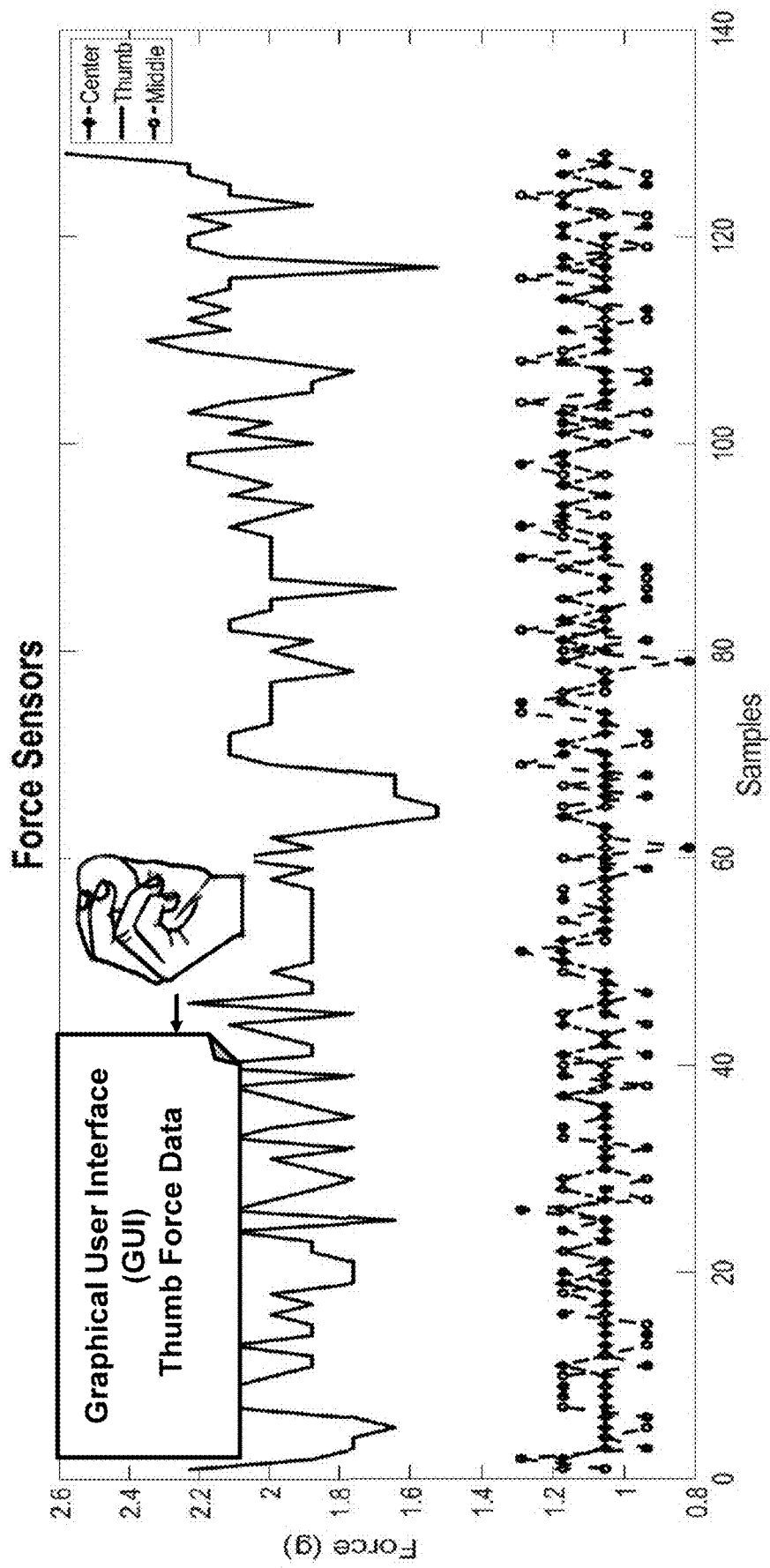
FIG. 9 a sample display of real-time force data according to an embodiment of the present invention.

The main graphical user interface (GUI) may run on a local PC host and can take all of the raw and converted measurements from the hand and display it accordingly. The GUI may also allow for observation of the flex and force sensors as illustrated in FIG. 9. FIG. 9 shows a sample display of the real-time force data, showing the results of slight thumbforce being exerted unto a ball.

On the left side of FIG. 9, a time history plot is shown of the three force sensors, the center, thumb, and middle. By applying a slight force unto a green exercise ball, this force may be reflected in the time-history plot. This may also be reflected in the histogram plot to the right of the same Figure. A 3D hand model may also be created that takes the real-time sampled data from the ADC on the SoC FPGA and create a 3D rotation based on the flex angle. Other tabs within the GUI may allow for real-time visualization of the IMU data. The IMU wrist, thumb, index, middle, ring and pinky information may all be displayed accordingly.

In this section, different hand exercises may be performed that demonstrate the gloves ability to detect possible hand exercises that can be used in an interactive gaming session. The glove may have the ability to detect various exercises, including, but not limited to: Power Grip, Ball Roll, Finger Tip, Cup and Remote Curl. For the sake of demonstration, we will focus on two main exercise classifications, which are power grip exercise (force-based) and cup exercise (rotation-based). Depending on the hand and finger orientation, the classifier may highlight the exercise as one possible exercise. After selecting it and performing the exercise, the exercise may be reported as shown in FIG. 10.

Figure 10:
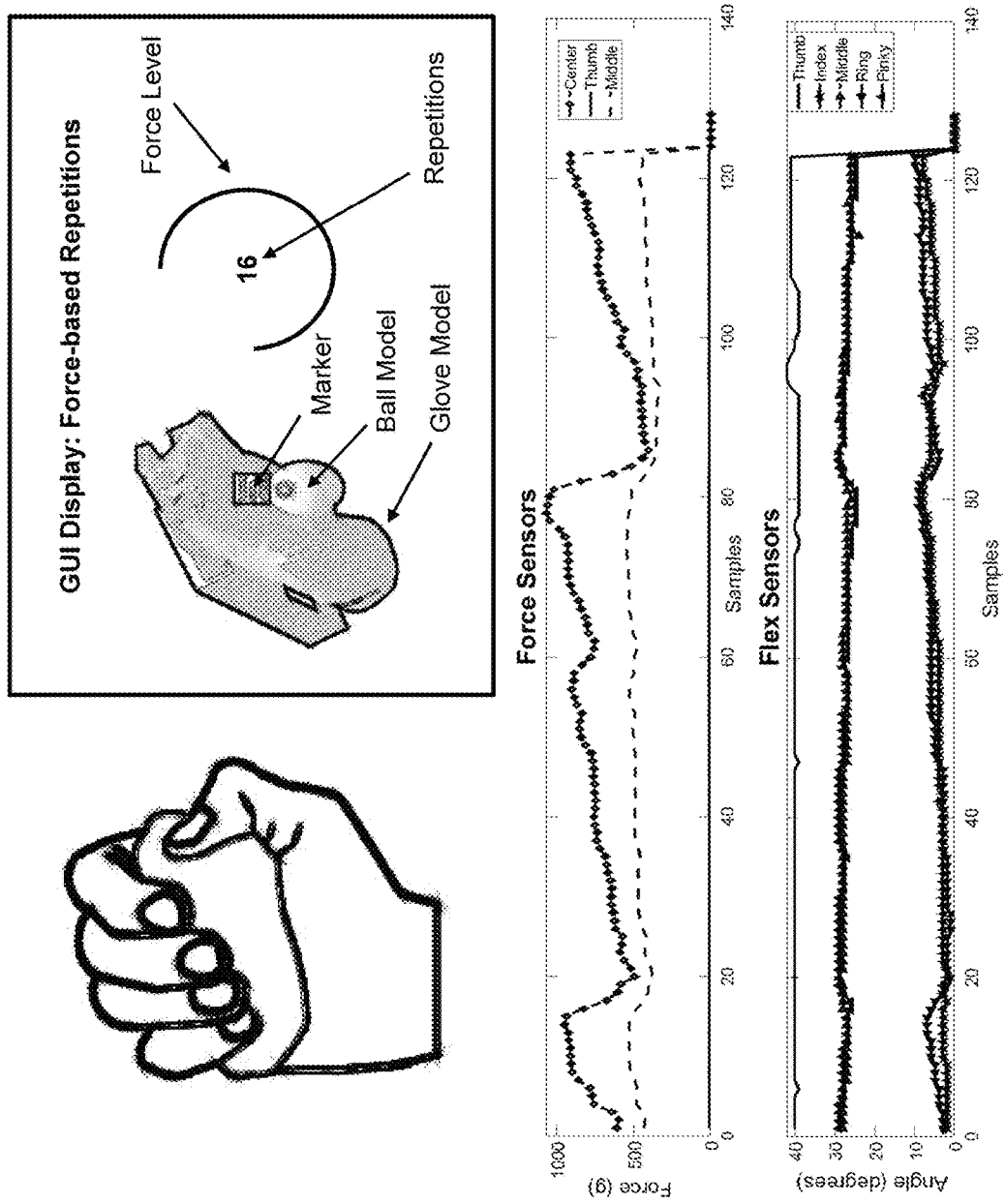
FIG. 10 illustrates the power grip exercise according to an embodiment of the present invention.

From FIG. 10, an interactive feedback may be provided to the user during the power grip exercise session. For the 3D model of the hand, the color code may change to indicate an increase in center pressure. The center force sensor result may also control the color coding of the hand model being displayed. So, for high hand pressure, the result may be red, and for no hand pressure, the result may be blue. The detailed real-time results are shown in the bottom plot of FIG. 10, which shows the variations in the hand-center and middle finger force sensors during the power-grip exercise. The flex sensor results may show an increase in flex angle of all the sensors during the power grip exercise. The results show that the power grip exercise may utilize different finger kinematics.

Figure 11:
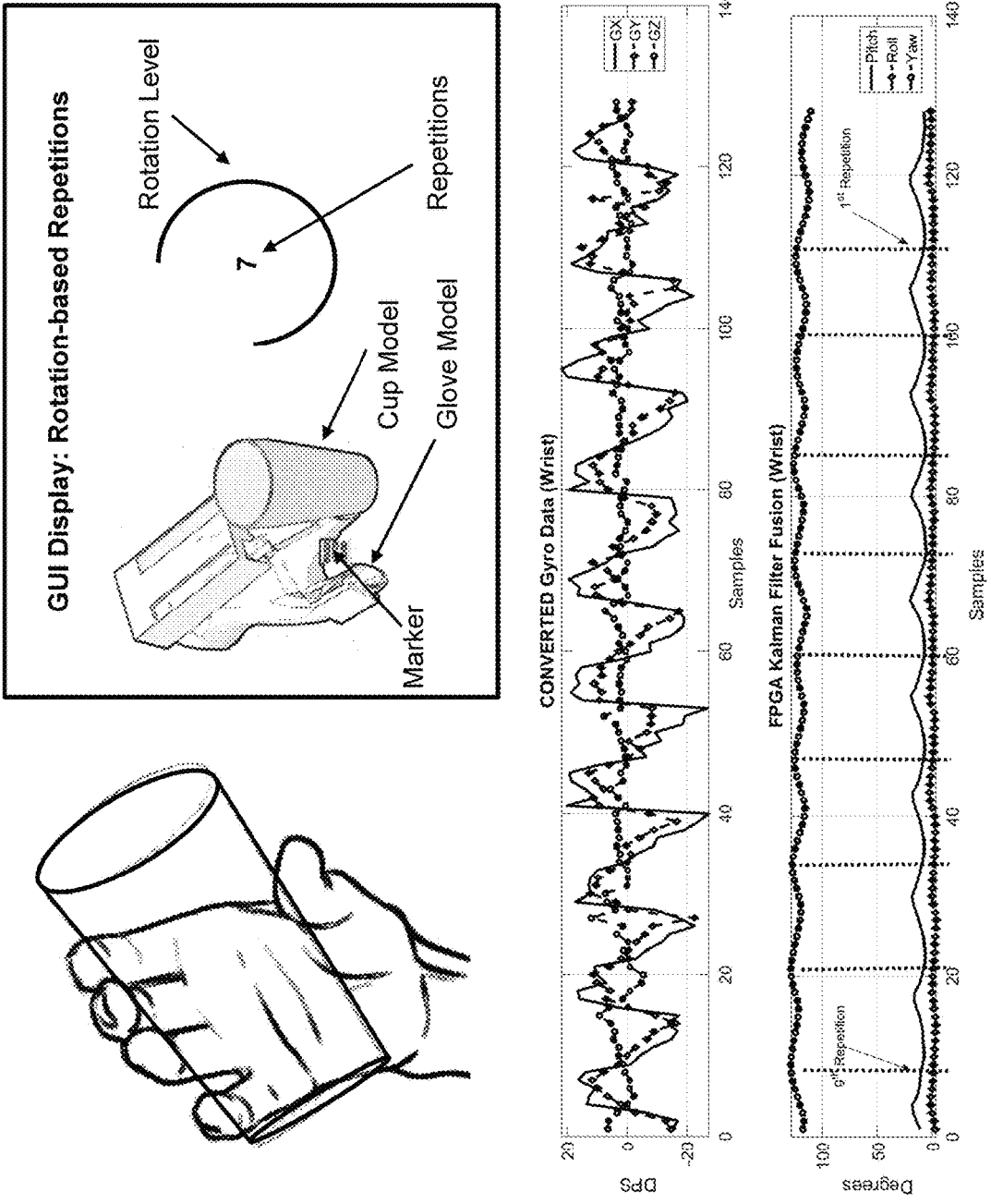
FIG. 11 illustrates the cup exercise according to an embodiment of the present invention.

FIG. 11 illustrates results of the cup exercise according to an embodiment of the invention. An image of the exercise is shown in the top left using an exercise cup. A 3D model of the cup and hand is shown to the right in an interactive gaming session. A detailed wrist IMU sensor breakdown during the exercise session is shown in the bottom plot, which consists of gyro, acceleration and magnetometer variations. From this figure, interactive feedback may be provided to the user during the cup exercise session. For the 3D model of the hand, the exercise may follow the user's hand interactions with the cup during the cup exercise. This can be a rotation-based exercise, meaning that the user may rotate the cup from an initial point to an end point to complete a full range of motion. The detailed real-time inertial measurement unit IMU results are shown in the bottom plot of FIG. 11, which show the variations can be due to gyro, acceleration and XY magnetometer measurements. The plot can also show a real-time plot of the wrist orientation and results of a Kalman filter running on the SoC FPGA. The Kalman filter running on the SoC FPGA may work by taking the raw sensor data (e.g., gyro, accel, and mag) and by performing a Quaternion-based Kalman filter that fuses all of the sensor data to produce the pitch, roll and yaw measurements. Given the power of the SoC FPGA, six Kalman filters may be running to compute the orientation of wrist, thumb, index, middle, ring and pinky measurements. Other sensor data may be displayed, such as the thumb, index, middle, ring, and pinky IMUs but for the sake of example, that data has been omitted. FIGS. 6-11 all demonstrate a working glove prototype that may be able to acquire, measure and compute the desired Fugl-Meyer assessment (FMA) scores depending on the exercise.

A second embodiment may now integrate up to sixteen channels of analog sensors for improved and increased flex/force sensing. In this second embodiment, an additional 8-channel analog-to-digital converter is included that doubles the sensing capabilities. As in previous embodiments, five variable resistive flex sensors may be used to measure the bend angle of each finger. The remaining eleven analog channels may be used to integrate more force sensors. Furthermore, in this embodiment, the glove design is composed of one complete 3D printed system with mesh-like interconnects that allow for more flexible and stretchable wearable. In addition, the base glove may now contain pockets that may hold the digital and analog sensors per finger. The digital sensors may still consist of a 9 DOF IMU. The analog sensor may consist of a force sensor and flex sensor per finger. Thus, for all five fingers, the five force sensors may be integrated. The remaining analog channels may be used to integrate more force sensors, three of which may be placed around the center of the palm (in their respective pockets). The remaining three force sensors may be placed in between fingers, to measure the pressure in the lateral finger motion, i.e., finger-to-finger interactions. In addition to increased sensor integration, the second embodiment may also incorporate a touch LCD interface that would allow the user to interact with the glove by simply using the touch interface. The 3D printed glove fabrication and electronic assembly of the second prototype are shown in FIG. 12.

Figure 12:
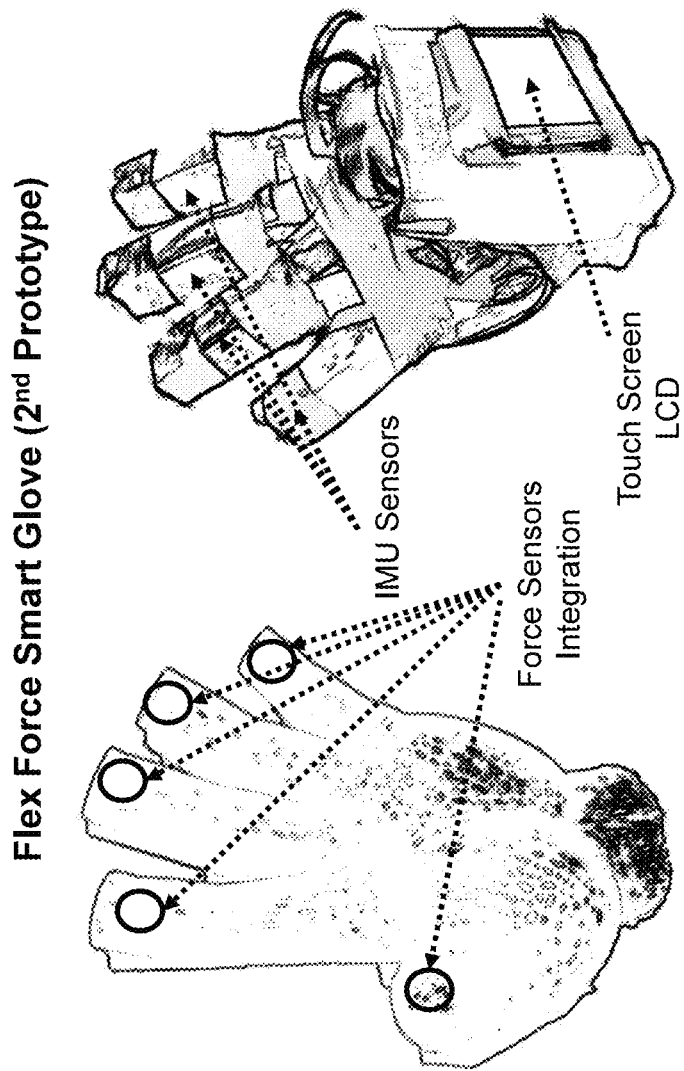
FIG. 12 illustrates a glove made of a Delaunay mesh that allows for more flexible and stretchable wearable design according to an embodiment of the present invention.

FIG. 12 shows a design of the second prototype starting with the new 3D printed design. The design is based on a Delaunay mesh that may allow for a more flexible and stretchable, wearable glove. A plurality of pockets for sensor integration may be included in this device that can house both the digital and analog sensors. A custom printed circuit board may be made that integrates all of the sixteen analog channels along with a touch screen LCD for ease of use.

A similar GUI used in the first embodiment may also be used to ascertain the functionality of the smart glove in real-time. This GUI may include three new additional tabs. The first new tab can focus on the real-time plotting of the force sensors. The second new tab can focus on the real-time plotting of the variable resistive flex sensors for each finger and can contain the 3D hand model as before. The third new tab may display the x-y position of the touch sensor pixel in real-time. This may allow for more detail observation of all of the sensors integrated in the smart glove.

There may also be an interactive game for use with the glove. The game may use the smart glove as a controller to control an avatar to perform different hand exercises. In at least one embodiment, the first element in the game is a main menu screen, which contains three buttons: start game, connect glove, and exit game. A user may select the connect glove button to trigger an event that instantiates a server socket and waits for the glove to connect to the game as a slave entity. The user of the glove may simply touch the connect button in the menu of the touch screen to connect the glove to the game. Once connected, the user may start streaming all of the sensor data to the game to begin using the glove as a controller. The menu screen may then show the real-time orientation of the smart glove along with the instantaneous pressure on each finger joints and wrist when the appropriate force is applied.

By selecting the start game menu, the user may start the game. The game can start with an audible tutorial that explains how to properly play the game with the glove. Each level can consist of conducting different hand exercises within the allotted time to complete the level. After the user completes the level, the user can be given detailed statistics on their scores, which can include metrics for displaying Fugl-Meyer assessment (FMA) scores. The end goal can be to regain function of the hand by increasing the strength of the motor functions and/or promoting neuroplasticity.

FIG. 1 depicts a circuit for the sensor system integrated with the glove. The circuit can include an embedded processor 2, an analog-to-digital converter (ADC) 3, a wrist inertial measurement unit (IMU) sensor 4, a plurality of finger IMU sensors 16, 17, 18, 19, 20, 21, 22, 23, 24, 25, a low power wireless interface 29, and a jumper/switch 26. The processor 2 can connect directly to the ADC 3, the wrist range-of-motion IMU sensor 4, the wireless interface I/O 29, and the jumper/switch 26. Additionally, the circuit can include an external USB connection 27, a touchscreen liquid crystal display (LCD) 28, a plurality of finger flex sensors 5, 6, 7, 8, 9, and a plurality of finger and palm force sensors 10, 11, 12, 13, 14, 15. The external USB connection 27 and the touchscreen LCD 28 may be configured to attach directly to the jumper/switch 26 and independently to one another. The plurality of flex sensors 5-9 and the plurality of force sensors 10-15 may be configured to attach directly to the ADC 3 and independently to one another.

The jumper/switch 26 can be used to provide a USB-to-RS232 connection via the external USB connection 27 to the processor 2 or to the touchscreen LCD 28. The touchscreen LCD 28 may be configured to accept serial, or RS232, commands that can be used for programming through the external USB connector 27. The touchscreen LCD 28 may also be configured to be used to change the display information through the processor 2.

The plurality of force sensors 5-9 may be configured to obtain the force in kilograms of the corresponding finger and palm of the user. By measuring the change in resistance due to the amount of force applied to the sensor of the corresponding finger of the user, the corresponding change in voltage can be digitized in the ADC 3. The connection between the processor 2 and the ADC 3 can occur through a first serial peripheral interface 25. The corresponding digitized change in voltage may be sent to the processor 2 for further analysis.

The plurality of flex sensors 10-15 may be configured to obtain the bend and/or flex position of the corresponding finger of the user. By measuring the change in resistance due to the amount of bend and/or flex of the corresponding finger of the user, the corresponding change in voltage can be digitized in the ADC 3. The connection between the processor 2 and the ADC 3 can occur through a first serial peripheral interface. The corresponding digitized change in voltage can be sent to the processor 2 for further analysis.

The wrist range-of-motion IMU sensor 4 can be configured to measure the rotation of the wrist of the user. The connection between the processor 2 and the range-of-motion IMU sensor 4 can occur through a two-wire serial interface. The measured rotation of the wrist of the user may be sent to the processor 2 for further analysis.

The touchscreen LCD 28 can be configured to display real-time sensorimotor information to the user of the glove. The real-time sensorimotor information may consist of the measurements obtained by the plurality of flex sensors 5-9, the wrist range-of-motion IMU sensor, the plurality of force sensors 10-15, and the plurality of finger range-of-motion IMU sensors 16-25. The touchscreen LCD 28 can also be configured to display diagnostics information such as the wireless link connection provided by the low power wireless interface 29. A jumper/switch can be configured to select between the touchscreen LCD 28 or the external USB-to-RS232 connection 27. The connection between the jumper/switch 26 and the processor 2 can occur through a first RS232 link. The connection between the low power wireless interface 29 and the processor 2 can occur through a second RS232 link.

In the preferred embodiment, the plurality of flex sensors 5-9 and the plurality of force sensors 10-15 in the circuit can be given definite numbers as depicted in FIG. 1. However, in other embodiments, the number of flex sensors and accelerometers is understood to be variable as design constraints may allow.

FIGS. 2 and 3 depict a sensor system integrated with a glove. The sensor system integrated with the glove can include the circuit. The circuit can further include an embedded processor 2, an analog-to-digital convertor (ADC) 3, the wrist range-of-motion IMU sensor 4, a plurality of finger flex sensors 5, 6, 7, 8, 9, a plurality of finger force sensors 10, 11, 12, 13, 14, 15, a plurality of finger IMU sensors 16, 17, 18, 19, 20, 21, 22, 23, 24, 25, a low power wireless interface 29, and the jumper/switch 26. The processor 2 can connect directly to the ADC 3, the wrist range-of-motion IMU sensor 4, the plurality of finger IMU sensors 16-25, the low power wireless interface 29, and the jumper/switch 26. Additionally, the circuit can include an external USB connection 27 and a touchscreen liquid crystal display (LCD) 28. The external USB connection 27 and the touchscreen LCD 28 may be configured to attach directly to the jumper/switch 26 and independently to one another. The plurality of flex sensors 5-9 and the plurality of force sensors 10-15 may be configured to attach directly to the ADC 3 and independently to one another.

The jumper/switch 26 can be used to provide a USB-to-RS232 connection via the external USB connection 27 to the processor 2 or the touchscreen LCD 28. In at least one embodiment, the touchscreen LCD 28 is configured to accept serial, or RS232, commands to be used for programming through the external USB connector 27. The touchscreen LCD 28 can be configured to be used to change the display information through the processor 2.

The plurality of flex sensors 5-9 can be configured to obtain the bend and/or flex position of the corresponding finger of the user. By measuring the change in resistance due to the amount of bend and/or flex of the corresponding finger of the user, the corresponding change in voltage can be digitized in the ADC 3. The connection between the processor 2 and the ADC 3 can occur through a first serial peripheral interface. The corresponding digitized change in voltage can be sent to the processor 2 for further analysis.

The wrist range-of-motion IMU sensor 4 can be configured to measure the rotation of the wrist of the user. The connection between the processor 2 and the wrist range-of-motion IMU sensor 4 can occur through a two-wire serial interface. The measured rotation of the wrist of the user can be sent to the processor 2 for further analysis.

The plurality of force sensors 10-15 can be configured to measure the force of the corresponding finger of the user. The connection between the processor 2 and the plurality of force sensors 15-24 can occur through a second serial peripheral interface. The measured force of the finger of the user can be sent to the processor 2 for further analysis.

The touchscreen LCD 28 can be configured to display real-time sensorimotor information to the user of the glove. The real-time sensorimotor information can be consist of the measurements obtained by the plurality of flex sensors 5-9, the wrist range-of-motion IMU sensor 4, the plurality of force sensors 10-15, and the plurality of finger range-of-motion IMU sensors 16-25. The touchscreen LCD 28 can also be configured to display diagnostics information such as the wireless link connection provided by the low power wireless interface 29. The jumper/switch 26 can be configured to select between the touchscreen LCD 23 or the external USB-to-RS232 connection 27. The connection between the jumper/switch 26 and the processor 2 can occur through a first RS232 link. The connection between the low power wireless interface 29 and the processor 2 can occur through a second RS232 link.

As can be seen in FIG. 2, the circuit can be attached to a glove portion. Each of the aforementioned components comprising the circuit, excluding the plurality of flex sensors 5-9 and the plurality of force sensors 10-15 (See FIG. 3), can be attached to a top side of the glove portion. The plurality of flex sensors 5-9 and the plurality of force sensors 10-15 can be attached to a bottom side of the glove portion. The glove portion can include a first finger portion, a second finger portion, a third finger portion, a fourth finger portion, a fifth finger portion, a palm portion, and a wrist aperture.

The first finger portion can be configured to at least partially encapsulate the finger of a user. As can be seen in FIG. 2, two of the plurality of finger IMU sensors 16, 21 can be configured to attach to the first finger portion. FIG. 3 shows that one of the plurality of flex sensors 5 and one plurality of force sensor 10 can be configured to attach to the first finger portion.

The second finger portion can be configured to at least partially encapsulate the finger of a user. As can be seen in FIG. 2, two of the plurality of finger IMU sensors 17, 22 can be configured to attach to the second finger portion. FIG. 3 shows that one of the plurality of flex sensors 6 and one plurality of force sensor 11 can be configured to attach to the second finger portion.

The third finger portion can be configured to at least partially encapsulate the finger of a user. As can be seen in FIG. 2, two of the plurality of finger IMU sensors 18, 23 can be configured to attach to the third finger portion. FIG. 3 shows that one of the plurality of flex sensors 7 and one plurality of force sensor 12 can be configured to attach to the first finger portion.

The fourth finger portion can be configured to at least partially encapsulate the finger of a user. As can be seen in FIG. 2, two of the plurality of finger IMU sensors 19, 24 can be configured to attach to the fourth finger portion. FIG. 3 shows that one of the plurality of flex sensors 8 and one plurality of force sensor 13 can be configured to attach to the fourth finger portion.

The fifth finger portion can be configured to at least partially encapsulate the finger of a user. As can be seen in FIG. 2, two of the plurality of finger IMU sensors 20, 25 can be configured to attach to the first finger portion. FIG. 3 shows that one of the plurality of flex sensors 9 and one plurality of force sensor 14 can be configured to attach to the first finger portion.

The palm portion can be configured to at least partially encapsulate the palm of the hand of the user. In at least one embodiment, the palm portion attaches to the finger portions at one distal end and attaches to the wrist aperture at another distal end. FIG. 3 shows one plurality of force sensor 15 attached to the palm portion. As can be seen in FIG. 2, the processor 2, the ADC 3, the low power wireless interface 29, the jumper/switch 26, the external USB connection 27, and the touchscreen LCD 28 can be each configured to attach to the palm portion.

The wrist aperture can be configured to at least partially encapsulate the wrist of a user. As can be seen in FIG. 2, the wrist range-of-motion IMU sensor 4 can be configured to attach to the wrist aperture of the glove portion.

The glove portion may be fabricated from any sort of material suitable for gloves known in the art. In the preferred embodiment, the glove portion is made of 3D printed mesh material. The circuit may be constructed and housed in any suitable manner. In the preferred embodiment, the circuit is made of on flexible printed circuit board. It is understood that although specific numbers and layouts of the various sensors mentioned in this specification are given, these merely constitute a preferred embodiment. As such, the number of sensors and layout of said sensors may be adjusted in practice according to design constraints for the sensor system integrated with the glove.

Figure 4:
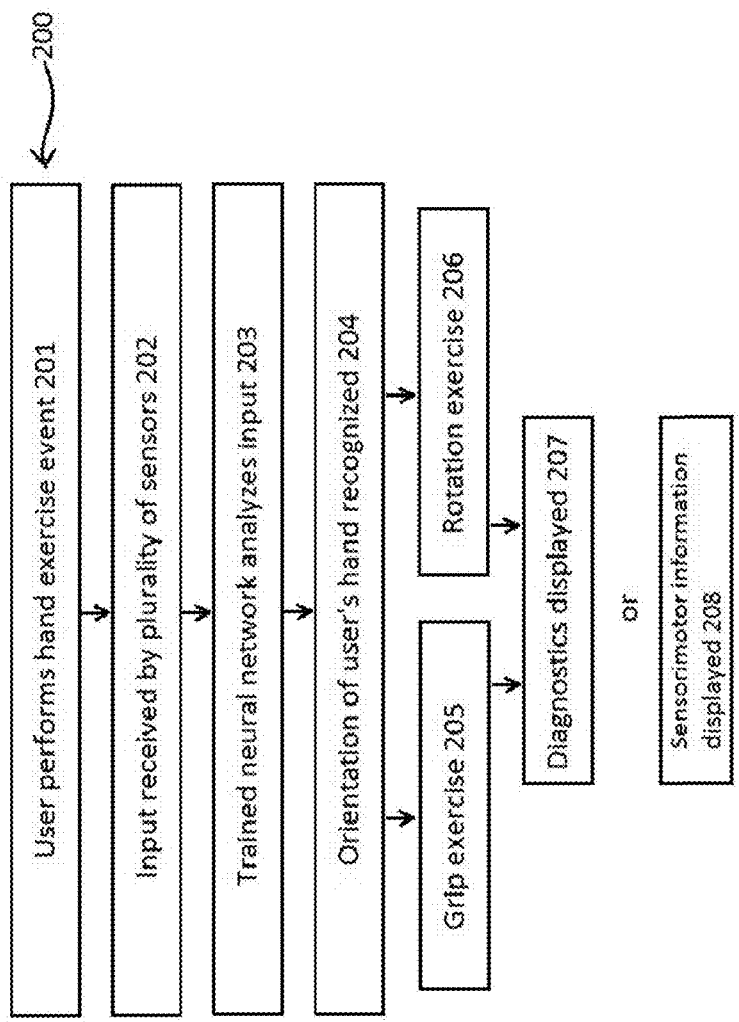
FIG. 4 is a flow chart of the method of exercise recognition according to an embodiment of the present invention.

FIG. 4 details a method of hand exercise recognition 200. When the user performs a hand exercise event 201, an input 202 may be received by at least one of the plurality of force sensors 15-24, the plurality of flex sensors 5-9, wrist range-of-motion IMU sensor 4, and plurality of finger range-of-motion IMU sensors 16-25. The input 202 can then be sent from the sensors to the processor 2. The processor 2 can analyze the input 202 and determine the hand exercise event 201 being performed by the user. The processor 2 can use a trained neural network 203 to analyze the input 202 from the hand exercise event 201. The trained neural network 203 can then recognize an orientation 204 of the hand of the user. Finally, the trained neural network 203 can classify the input 202 and the orientation 204 as a grip exercise 205 and/or a rotation exercise 206.

Further, the hand exercise event 201, once it has been analyzed and determined by the processor 2, may be displayed on the touchscreen LCD 28. The touchscreen LCD 28 may also display at least one of diagnostics information 207 and real-time sensorimotor information 208. The processor 2 may also send the hand exercise event 201 to the local host (i.e. PC) via the external USB connection 27, or wirelessly via the low power wireless interface 29.

Figure 13:
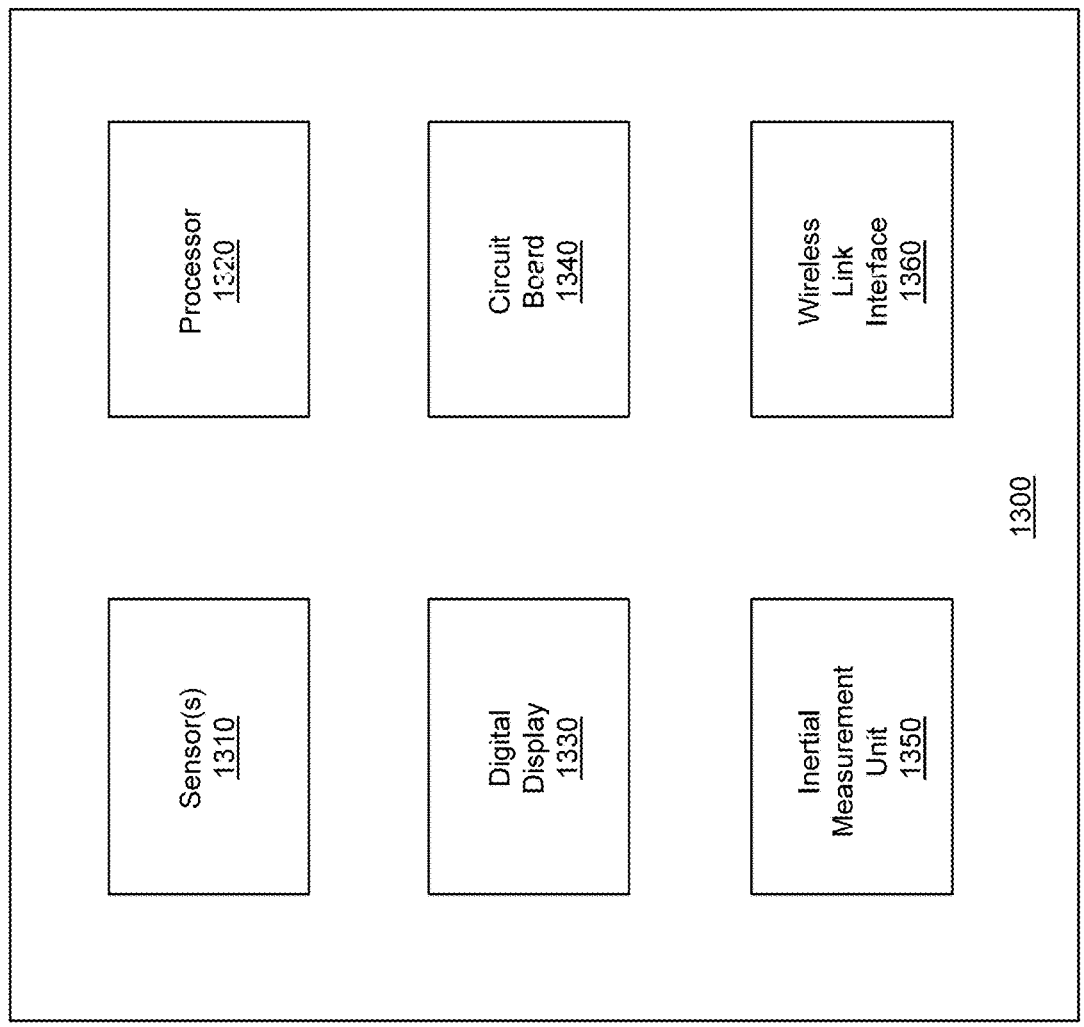
FIG. 13 is a diagram illustrating a flex force smart glove for measuring sensorimotor stimulation according to an embodiment of the invention.

FIG. 13 is a diagram illustrating a flex force smart glove 1300 for measuring sensorimotor stimulation according to an embodiment of the invention. The glove 1300 includes at least one sensor 1310 and a processor 1320 connected to the sensor 1310. As used herein, the term "connected" includes operationally connected, logically connected, in communication with, physically connected, engaged, coupled, contacts, linked, affixed, and attached. In at least one embodiment, it is recognized that the processor 1320 can be external to the glove 1300 (e.g., linked wirelessly). The sensor 1310 can include a force sensor, a flex sensor, and/or a range-of-motion sensor (e.g., IMU). The processor 1320 analyzes input from the sensor 1310 to determine an exercise being performed by a user of the glove 1300.

The glove 1300 can also have a digital display 1330 for displaying the determined exercise and a circuit board 1340 connected to the sensor 1310 and the processor 1320. In at least one embodiment, the digital display 1330 is external to the glove 1300 (e.g., wirelessly linked). The circuit board 1340 can include holes for mounting the digital display 1330. The circuit board 1340 can be constructed of a flexible and stretchable printed material. The glove 1300 can be constructed of a flexible and stretchable mesh material. The glove 1300 can also include a 9 degrees of freedom IMU 1350 that can receive second input from the user, and a wireless link interface 1360 that sends input to a local host.

Figure 14:
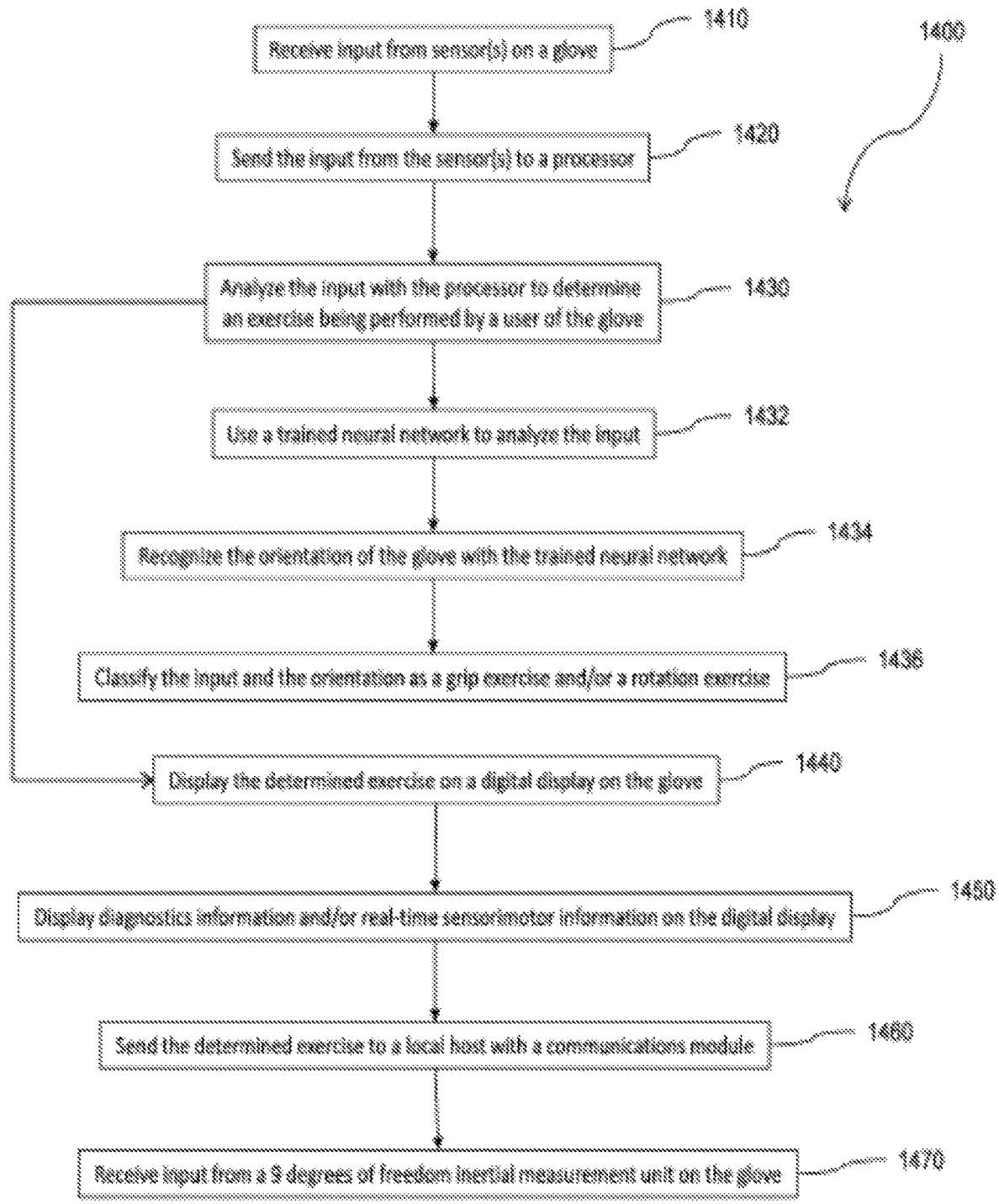
FIG. 14 is a flow diagram illustrating a method for using a flex force smart glove for measuring sensorimotor stimulation according to an embodiment of the invention.

FIG. 14 is a flow diagram illustrating a method 1400 for using a flex force smart glove for measuring sensorimotor stimulation according to an embodiment of the invention (e.g., using the flex force smart glove 1300). Input is received in at least two sensors on a glove 1410, where the sensors include a force sensor, a flex sensor, and a range-of-motion IMU sensor. The input is sent from the sensors on the glove to the processor on the glove 1420.

The input is analyzed with the processor to determine an exercise being performed by a user of the glove 1430. In at least one embodiment, a trained neural network 1434 is used to analyze the input from the sensors 1432. The orientation of the glove is recognized with the trained neural network 1434; and, the input and the orientation are classified as a grip exercise and/or a rotation exercise 1436.

The determined exercise is displayed on a digital display (e.g., on the glove) 1440. Diagnostics information and/or real-time sensorimotor information are also displayed on the digital display 1450. The determined exercise is sent to a local host with a communications module 1460. The determined exercise can be sent through a wireless link interface to the local host. Input from a 9 degrees of freedom IMU on the glove can also be received 1470.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 15, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 1910. The CPUs 1910 are interconnected with system bus 1912 to various devices such as a random-access memory (RAM) 1914, read-only memory (ROM) 1916, and an input/output (I/O) adapter 1918. The I/O adapter 1918 can connect to peripheral devices, such as disk units 1911 and tape drives 1913, or other program storage devices that are readable by the system. The system can read the inventive instructions on the program storage devices and follow these instructions to execute the methodology of at least one embodiment of the invention. The system further includes a user interface adapter 1919 that connects a keyboard 1915, mouse 1917, speaker 1924, microphone 1922, and/or other user interface devices such as a touch screen device (not shown) to the bus 1912 to gather user input. Additionally, a communication adapter 1920 connects the bus 1912 to a data processing network 1925, and a display adapter 1921 connects the bus 1912 to a display device 1923 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    receiving input in at least one sensor on a glove, said at least one sensor comprising at least one of a force sensor, a flex sensor, and a range-of-motion sensor;
    sending the input from said at least one sensor on said glove to a first processor on the glove;
    analyzing the input with said first processor affixed to said glove to determine an exercise being performed by a user of said glove in real-timer; and
    sending the determined exercise from said first processor to a second processor affixed to said glove, the second processor configured to perform real-time graphic processing and display of information related to the determined exercise to the user of the glove.

2. The method according to claim 1, further comprising performing graphics processing at the second processor and displaying said determined exercise on an LCD touchscreen digital display on said glove in real-time.

3. The method according to claim 2, further comprising displaying at least one of diagnostics information and real-time sensorimotor information on said digital display on said glove.

4. The method according to claim 1, further comprising sending said determined exercise and real-time sensorimotor information to a local host with a communications module incorporated in said second processor on the glove.

5. The method according to claim 1, further comprising sending said determined exercise and real-time sensorimotor information through a wireless link interface incorporated in said second processor on the glove to the local host.

6. The method according to claim 1, further comprising receiving input from a 9 degrees of freedom inertial measurement unit on said glove, wherein said input is analyzed with the first processor affixed to said glove to determine an exercise being performed by a user of the glove in real-time.

7. The method according to claim 1, further comprising:
    using a trained neural network incorporated in said first processor on the glove to analyze the input from at least one of said force sensor on said glove and said range-of-motion sensor on said glove;
    recognizing the orientation of said glove with said trained neural network; and
    classifying the input and the orientation as at least one of a grip exercise and a rotation exercise in real-time,
    wherein sending the determined exercise comprises sending the exercise classification data from said first processor to the second processor affixed to said glove; and
    wherein the second processor performs the real-time graphic processing and display of the exercise classification data to the user of the glove.

8. A glove, comprising:
    at least one sensor, said at least one sensor comprising at least one of a pressure sensor and a range-of-motion sensor;
    a first processor on the glove connected to said at least one sensor, said first processor analyzes input from said at least one sensor to determine an exercise being performed by a user of said glove in real-time; and
    a second processor on the glove connected to said first processor, said second processor configured to analyze the exercise determination input from the first processor to achieve real-time graphic processing and display of information related to the exercise to the user of the glove.

9. The glove according to claim 8, further comprising an LCD touchscreen digital display for displaying the determined exercise and sensorimotor information in real-time.

10. The glove according to claim 9, further comprising a circuit board connected to said at least one sensor and said processor, wherein said circuit board is constructed of a flexible and stretchable 3D printed material to enable user input processing, graphic processing, and display functions on the glove in real-time.

11. The glove according to claim 8, further comprising a 9 degrees of freedom inertial measurement unit incorporated in said first processor, wherein said 9 degrees of freedom inertial measurement unit receives second input from the user.

12. The glove according to claim 8, further comprising a wireless link interface, wherein said wireless link interface is incorporated in said second processor on the glove and sends input to a local host.

13. The glove according to claim 8, further comprising a Delaunay mesh wearable fabric, wherein said Delaunay mesh makes the glove stretchable and flexible.

14. A method, comprising:
receiving input in at least two sensors on a glove, said at least two sensors including at least one of a pressure sensor, a flex sensor, and a range-of-motion IMU sensor;
sending the input from said at least two sensors on said glove to a first processor on said glove;
analyzing the input with said first processor to determine an exercise being performed by a user of said glove, comprising:
using a trained neural network incorporated in said first processor on the glove to analyze the input from said at least two sensors, recognizing the orientation of said glove with said trained neural network, and
classifying the input and the orientation as at least one of a grip exercise and a rotation exercise in real-time; and
sending the determined exercise from said first processor to a second processor affixed to said glove configured to achieve real-time graphic processing and display to the user of the glove.

15. The method according to claim 14, further comprising performing graphics processing at the second processor and displaying said determined exercise on an LCD touchscreen digital display on said glove.

16. The method according to claim 15, further comprising displaying at least one of diagnostics information and real-time sensorimotor information on said digital display on the glove.

17. The method according to claim 14, further comprising sending said determined exercise and real-time sensorimotor information to a local host with a communications module incorporated in said second processor on the glove.

18. The method according to claim 14, further comprising sending said determined exercise and real-time sensorimotor information through a wireless link interface incorporated in said second processor on the glove to the local host.

19. The method according to claim 14, further comprising receiving input from a 9 degrees of freedom inertial measurement unit on said glove, wherein said input is analyzed with the first processor affixed to said glove to determine, in real time, an exercise being performed by a user of the glove.

* * * * *